United States Patent [19]
Davies

[11] 4,012,539
[45] Mar. 15, 1977

[54] METHOD OF APPLYING AND BONDING A BEARING LINING COMPRISING A MIXTURE OF AN ARYLENE SULPHIDE POLYMER AND A METALLIC OXIDE TO A BACKING MATERIAL

[75] Inventor: Glyndwr John Davies, London, England

[73] Assignee: The Glacier Metal Company Limited, Wembley, England

[22] Filed: Aug. 14, 1975

[21] Appl. No.: 604,842

[30] Foreign Application Priority Data

Aug. 21, 1974 United Kingdom ............ 36669/74

[52] U.S. Cl. .............................. 427/195; 252/12; 260/37 M; 260/37 R; 427/202
[51] Int. Cl.² .......................................... B05D 3/02
[58] Field of Search ............ 427/202, 195; 252/12; 260/37 M, 37 R

[56] References Cited
UNITED STATES PATENTS

| | | | |
|---|---|---|---|
| 3,285,850 | 11/1966 | Graham | 252/12 X |
| 3,354,129 | 11/1967 | Edmonds et al. | 260/37 R X |
| 3,453,208 | 7/1969 | Gallagher et al. | 252/12 |
| 3,567,504 | 3/1971 | Hopkins et al. | 428/309 |
| 3,592,783 | 7/1971 | Edmonds | 252/12 X |
| 3,716,609 | 2/1973 | Trocciola et al. | 260/37 M |
| 3,730,893 | 5/1973 | Bilow et al. | 252/12 X |
| 3,737,411 | 6/1973 | Scoggins | 260/37 M X |
| 3,801,379 | 4/1974 | Blackwell | 427/195 X |
| 3,878,113 | 4/1975 | Campbell et al. | 252/12 |
| 3,882,030 | 5/1975 | Campbell et al. | 252/12 |

*Primary Examiner*—Ronald H. Smith
*Assistant Examiner*—Shrive P. Beck
*Attorney, Agent, or Firm*—Pierce, Scheffler & Parker

[57] ABSTRACT

This invention is a new method of applying an arylene sulphide polymer bearing lining to a bearing backing in particular where the polymer is poly phenylene sulphide. In order to get effective cross-linking in the linking and effective bonding to the backing it has been found of importance to include with the uncured polymer an oxidizing agent preferably a metallic oxide powder in the proportion by weight to the polymer of about 5:95. Copper, tin, lead and manganese are preferred metallic oxides because the residue metals left in the bearing lining can have helpful bearing properties in certain applications.

10 Claims, No Drawings

METHOD OF APPLYING AND BONDING A BEARING LINING COMPRISING A MIXTURE OF AN ARYLENE SULPHIDE POLYMER AND A METALLIC OXIDE TO A BACKING MATERIAL

This invention relates to a bearing lining on a strong backing.

According to the present invention in a method of applying and bonding a bearing lining of arylene sulphide polymer to a backing, an uncured arylene sulphide is applied to the backing and cured in the presence of oxygen. The presence of oxygen may be achieved by carrying out the curing by heating in a controlled oxygen atmosphere, but preferably it is achieved by including an oxidising agent with the uncured arylene sulphide. A further possibility is to tumble the arylene sulphide polymer powder in liquid oxygen and to carry out the curing process while that oxygen is still present.

Thus the uncured arylene sulphide could be in the form of a powder which may be mixed with, for example, a metallic oxide powder, possibly in proportions of about 95:5 be weight of arylene sulphide to metallic oxide. Preferred metal oxides are $CuO$, $SnO_2$, $PbO_2$, and $MnO_2$, because the residue metals after having given up some or all of their oxygen will remain in the bearing lining and can improve the performance of the lining in certain applications.

The backing may be of aluminium or aluminium alloy or may be of steel in which case if there is any difficulty in achieving a satisfactory bond between the backing and the lining an aluminium foil can be first bonded to the surface of the steel for reception of the lining.

The bearing may be a preformed article of complicated shape or may be in the form of an elongate flat strip for subsequent formation into bearings in which case the lining can be bonded and applied in a continuous process to continuously driven rolls of strip material.

A preferred arylene sulphide is poly phenylene sulphide and a convenient curing process in that case is heating in the range from about 370° to 380° C for between 10 and 20 minutes depending on the thickness of the lining. 15 minutes is a preferred curing time.

Arylene sulphide polymers have been proposed as non-stick linings for frying pans and saucepans but the layers have not been more than about 0.001 inch thick and could be applied by a simple spraying method. That thickness is inadequate for a bearing lining.

The bearing linings contemplated in the present invention may be at least 0.005 inch or 0.015 inch thick and in order to get effective curing and bonding in a reasonably short time it has been found necessary to have oxygen present and preferably within the body of the powdered or other arylene sulphide polymer which is being cured. This also helps the cross-linking of the polymer during curing to provide a particularly effective bearing lining material which is tough and abrasion-resistant and does not easily melt or lose its properties at temperatures above 300° C. The temperature at which the bearing properties are retained can be increased by getting effective cross-linking using the method of the present invention because the cross-linking can then occur throughout the thickness of the lining.

Spraying on many successive coats of up to 0.001 inch each is an uneconomical and slow process and even then good bonding between layers is not assured.

The method of the invention improves the strength of the bond and has enabled a bond to be achieved that withstands a test whereby for a coating in the range 0.005 to 0.015 inch thick the backing can be bent at 90° after having been immersed in boiling water without there being sufficient cracking to permit the lining being peeled off.

Although four particular metallic oxides have been mentioned above as being desirable oxidising agents in many cases, other oxidising agents that are suitable are oxides of: Vanadium, chromium, iron, cobalt, nickel, molybdenum, silver, cadmium, tungsten, bismuth, antimony and indium. In many cases higher metallic oxides are preferred, particularly where the oxygen is given up only at temperatures at least in the region of 300° C.

The invention also includes a bearing consisting of a backing with a lining bonded to it consisting of arylene sulphide polymer together with a metal.

The invention may be carried into practice in various ways and certain examples will now be described:

EXAMPLE 1

Finely powdered manganese dioxide with a maximum powder dimension of 50 microns was mixed with poly phenylene sulphide powder in a proportion by weight of 5 to 95% using a high speed powder mixer.

The mixture was then sprayed using a powder spraying die over a continuously moving strip of aluminium alloy to give a powder layer between 0.055 and 0.065 inch. The moving strip was passed through a heating zone in which it remained for 15 minutes at a temperature between 370° and 380° C from which the strip emerged with a cured poly phenylene sulphide layer 0.010 inch thick bonded to it and containing distributed through it some manganese. The strip was sufficiently ductile for subsequent formation into semicylindrical shell bearings without failure of the bond or curing of the lining.

EXAMPLE 2

The method of Example 1 was followed with the variation that lead oxide $PbO_2$ was used instead of manganese dioxide in an amount of 7% by weight with 93% of poly phenylene sulphide powder. The thickness of the powder was about 0.075 inch and the backing consisted of a steel strip carrying an aluminium foil. Heating continued for 20 minutes.

EXAMPLE 3

A similar method was followed but used 3% of stannic oxide $SnO_2$, the layer of powder before curing being 0.040 inch thick, and heating only lasted for 12 minutes. The backing was an aluminium alloy.

EXAMPLE 4

Finely powdered poly phenylene sulphide powder was sprayed on a moving strip of pure aluminium and passed through a heating zone in a temperature in which the atmosphere was controlled to be substantially pure oxygen. Heating was at 370° C for 15 minutes and once again a satisfactorily bonded cross-linked poly phenylene sulphide lining was obtained even without the use of a metallic oxide as an oxidising agent.

EXAMPLE 5

Poly phenylene sulphide powder was tumbled in liquid oxygen and immediately laid on the bearing surface of a preformed engineering component in an atmosphere of substantially pure oxygen in which it was raised to a temperature of 375° C for 15 minutes. Once again a satisfactorily bonded poly phenyl bearing lining 0.012 inch thick was obtained.

In each of Examples 1, 2 and 3, some residue metal from the metallic oxide was present in the lining.

What I claim as our invention and desire to secure by Letters Patent is:

1. A method of applying and bonding a bearing lining comprising a mixture of arylene sulphide polymer and a metallic oxide to a backing in which uncured arylene sulphide is applied to the backing in powdered form with an oxide of copper, tin, lead, or manganese, also in powdered form, in the proportion of about 5–95 by weight of the arylene sulphide polymer, and is cured by heating at a temperature of at least 370° C. in the presence of oxygen substantially provided by said oxide.

2. A method as claimed in claim 1 in which the arylene sulphide polymer is poly phenylene sulphide.

3. A method as claimed in claim 2 in which the backing is of steel or aluminium or steel with an aluminium lining.

4. A method as claimed in claim 2 in which the bearing lining after curing is at least 0.005 inch thick.

5. A method as claimed in claim 4 in which the lining is at least 0.015 inch thick.

6. A method as claimed in claim 1 in which the heating is performed for at least about 15 minutes.

7. A method as claimed in claim 2 in which the backing is a continuous elongate strip.

8. A method as claimed in claim 7 in which the backing passes continuously through a heating zone.

9. A method as claimed in claim 8 in which individual lengths of elongate strip are formed into semi-cylindrical bearing shells.

10. A method as claimed in claim 2 in which the backing is a preformed bearing.

* * * * *